No. 696,254. Patented Mar. 25, 1902.
A. J. NASH.
MEANS FOR PRESSING, PERFORATING, AND CUTTING GLASS IN SHAPES.
(Application filed Mar. 16, 1900. Renewed Sept. 11, 1901.)
(No Model.) 2 Sheets—Sheet 1.
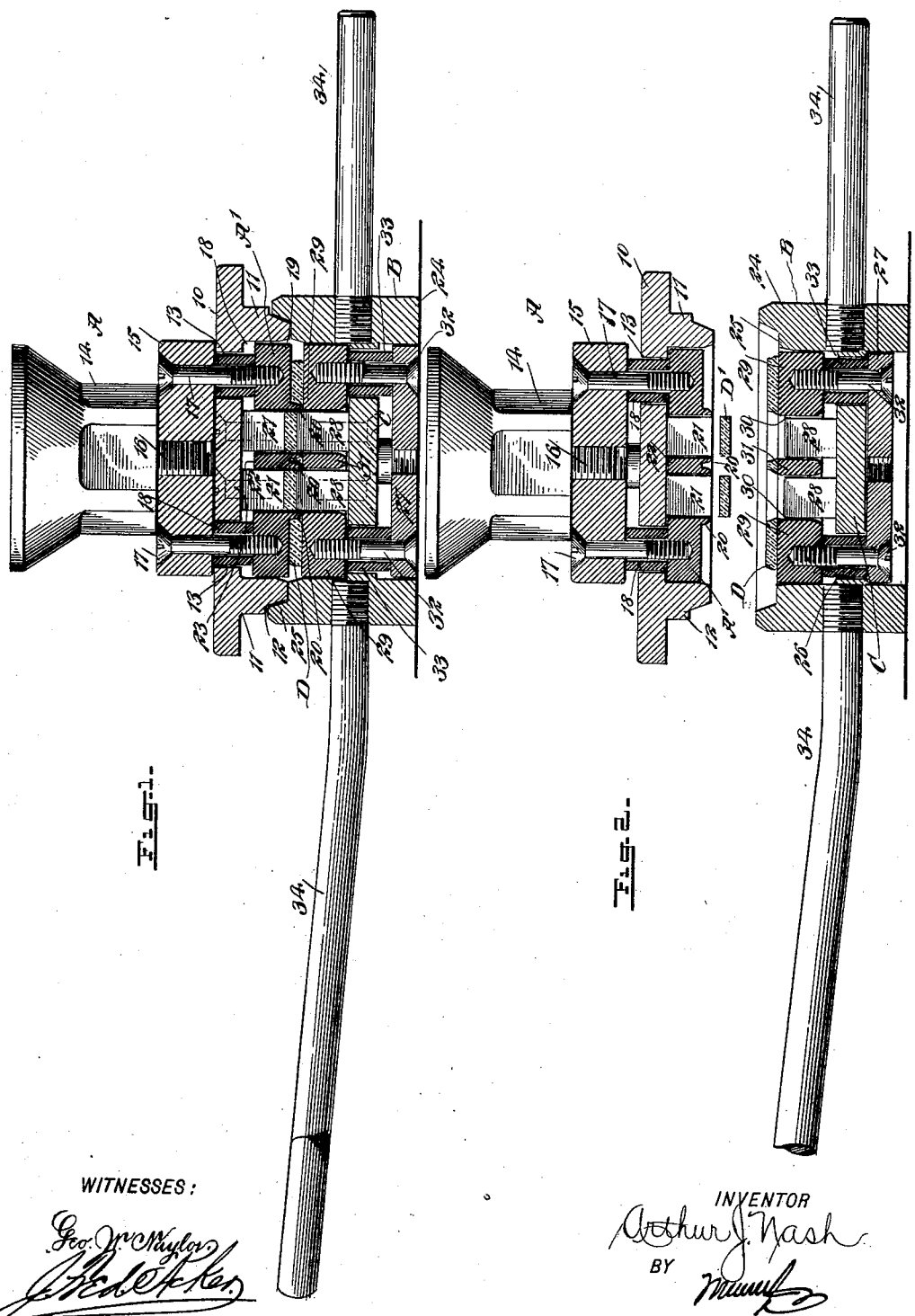
WITNESSES:
INVENTOR
BY
ATTORNEYS

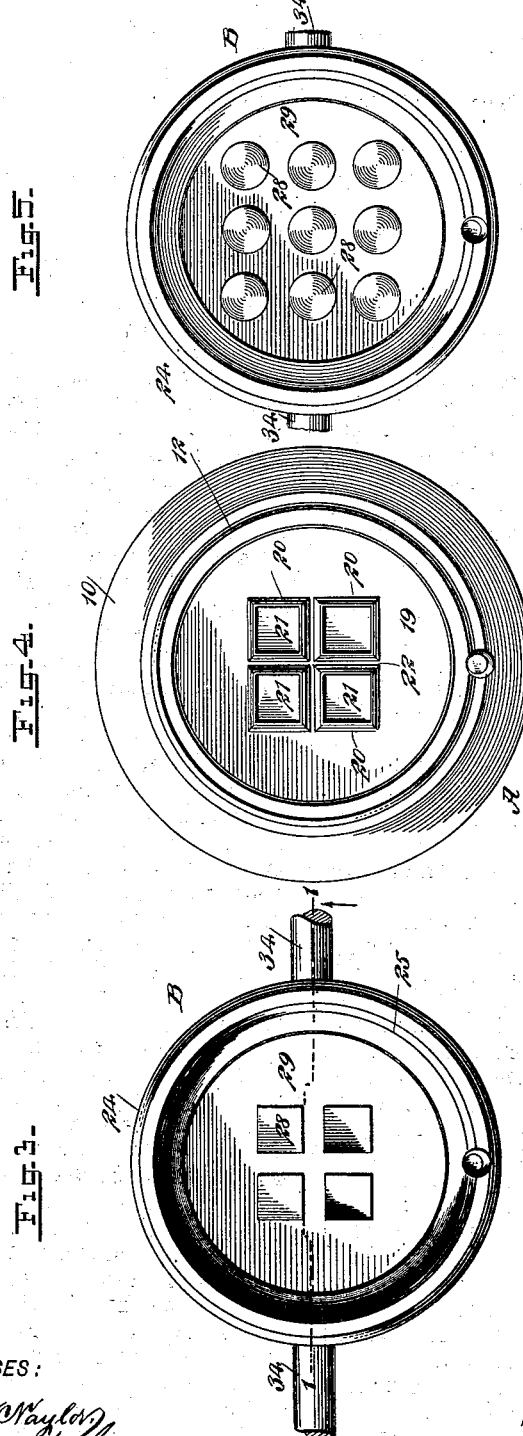

UNITED STATES PATENT OFFICE.

ARTHUR J. NASH, OF NEW YORK, N. Y.

MEANS FOR PRESSING, PERFORATING, AND CUTTING GLASS IN SHAPES.

SPECIFICATION forming part of Letters Patent No. 696,254, dated March 25, 1902.

Application filed March 16, 1900. Renewed September 11, 1901. Serial No. 75,058. (No model.)

*To all whom it may concern:*

Be it known that I, ARTHUR J. NASH, a citizen of the United States, and a resident of the city of New York, (Corona, borough of Queens,) in the county of Queens and State of New York, have invented a new and Improved Means for Pressing, Perforating, and Cutting Glass in Shapes, of which the following is a full, clear, and exact description.
The purpose of the invention is to provide means whereby at one operation a sheet of glass may be pressed and parts cleanly removed, so that various openings of any design that fancy may dictate may be produced in the sheet and the openings may be filled with the same material or material of different character or color, and so also that the particles removed may be utilized for tiling or for analogous purposes.
The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through a mold, showing the same in operation, the glass having been cut and the members of the mold not having been separated, the section being taken on the line 1 1 in Fig. 3. Fig. 2 is a view similar to Fig. 1, illustrating the two members or sections of the mold separated and the plunger shut upon one of the sections and the removed particles as dropping from the opposing section. Fig. 3 is a plan view of the lower or female section of the mold. Fig. 4 is a bottom plan view of the upper or male section of the mold; and Fig. 5 is a plan view of the female section of the mold, illustrating the said section as provided with a different design or die.

The die is made, as usual, in two sections—
a male section A and a female section B. The male section consists of a body 10, preferably of circular construction and provided with a downwardly-extending flange 11, having an annular shoulder 12 produced exteriorly near its lower end. Openings 13 are produced in the said body within the flange 11, and these openings may be of any desired number. Usually, however, four are employed. A head 14, preferably solid, is secured in any suitable or approved manner to a block 15, which block is usually made circular, but is of less diameter than the body 10. The head is connected with the block 15 usually through the medium of a threaded stem 16, as illustrated in Figs. 1 and 2. Screws 17 are passed through the block 15 and likewise loosely through sleeves 18, which turn loosely in the openings 13 in the body 10, and the lower ends of the screws 17 are secured in a matrix A', whereby the matrix may be moved up and down in the body 10 of the male section of the mold. The matrix A' is provided with a series of openings, each opening being surrounded by a marginal cutting-rib or embossed surface 20, as shown in Figs. 1, 2, and 4, in which views the openings are shown as four in number and grouped so as to form a rectangular figure. Plungers 21 are secured to the under face of the central portion of the body 10 of the male section, and these plungers are so located and are of such dimensions that they slide freely yet closely in the openings surrounded by the cutting-ribs 20 of the matrix, and when the body 10 of the male section is in its lower or normal position the lower faces of the plungers 21 are flush with the cutting-ribs 20, surrounding the openings which receive the said plungers. In the drawings the dividing-partition of the openings surrounded by the cutting-ribs 20 is designated as 22. These ribs 20 may be made integral with the matrix A' or they may be attached thereto by bolts, screws, or equivalent means.

The female section B of the mold consists of a circular ring-like body 24, having a depressed shoulder 25 at its upper surface of such shape that it will receive the shoulder 12, formed on the body of the male section of said mold. This female section B of the mold is provided with a horizontal partition C, which is preferably integral with the casing or body 24. A disk 29 is mounted for movement in the upper portion of the body 24. This disk is provided with a series of openings 30, corresponding to the openings in the matrix A', and plungers 28 are adapted to fit snugly yet freely in the openings 30, the said plungers being attached to the central portion of the partition C, corresponding in number, location, and form to the plungers 21 of the male section of the mold. The dividing-wall between the openings 30 in the disk 29 is designated as 31 and is best shown in Fig. 2. A second disk 27 is located below the partition C and is likewise mounted for movement in the body or casing 24. The disk 27 is connected with the disk 29 through the medium of screws 32 or their equivalents, and these screws are loosely passed through sleeves 33, which sleeves extend from the disk 27 to the disk 29 loosely in openings 26 made in the partition C. Normally the upper edges of the plungers 28 are above the upper surface of the disk 29, forming the upper portion of the female section of the mold. A handle 34 is usually attached in sections to opposite sides of the body 24 of the female section, so that this portion of the mold may be reversed or the entire mold lifted and moved from place to place.

In operation the plungers 28 extending above the plain surface of the female section of the mold, the molten glass is poured thereon, as shown at D, and the upper section of the mold is then placed upon the lower section, at which time the plungers 21 of the upper section of the mold will be flush with the cutting edges surrounding the openings in the matrix of the said upper section. Thus the matrix of the male section of the mold will simply rest upon the upper surface of the molten glass. Pressure is now applied to the head 14 in any suitable or approved manner, the pressure being sufficient to force the cutting edges surrounding the openings in the matrix down through the sheet of glass between the two sections of the mold, thus pressing the sheet and producing therein openings corresponding in shape to the openings in the matrix and in the upper face of the female section of the mold, while the material is removed from these openings or separated from the sheet, forming tiles which may be utilized for any desired purpose.

I desire it to be understood that I do not confine myself to any shape of plungers or openings in which the plungers are to work—as, for example, in Fig. 5 I have illustrated the plungers as having a circular formation instead of a rectangular form and as being nine in number instead of four.

After the impression and cutting have been produced in and on the sheet of glass the male section of the mold is removed, whereupon the plungers 21, assuming their normal position, will force outward from said section the tiles D', (illustrated in Fig. 2,) and the perforated sheet may then be removed from the female section of the mold or may be forced therefrom by turning over the said section, thus carrying the sheet of glass above the plungers 28, or the movable portion of the female section of the mold may be operated in like direction in any other manner.

Having thus described my invention, I claim as new and desire to secure by Letters Patent—

1. In an apparatus of the kind described, the combination with a subjacent die, of a body-plate 10 having a downwardly-projecting flange with an annular shoulder and one or more central downwardly-projecting plungers said plate having holes through it at points intermediate to the plungers and outer flange, a matrix arranged in the plane of said flange and plungers and having on the lower side marginal cutter-ribs surrounding and fitting close about the plungers, a block arranged above the body-plate and screws passing through the holes in the body-plate and connecting the matrix to said block substantially as described.

2. In an apparatus of the kind described, the combination with a subjacent die, of a body-plate 10 having a downwardly-projecting flange with an annular shoulder, and one or more central downwardly-projecting plungers said plate having holes through it at points intermediate to the plungers and the outer flange, a matrix arranged in the plane of said flange and plungers and having on the lower side marginal cutter-ribs surrounding and fitting close about the plungers, and sleeves on the upper side extending through the holes in the body-plate, a block arranged above the body-plate and screws connected to said block and fastening into the sleeves of the matrix substantially as and for the purpose described.

3. In an apparatus of the kind described, the combination with a superposed die, of the body portion 24 having a partition C and external handles, and having on its upper surface a marginal shoulder and one or more centrally-arranged and upwardly-projecting plungers said body portion having also openings between the plungers and marginal shoulder, and disks 27 and 29, the disk 27 being arranged below the partition C, and 29 above it, and screws connecting the two together through said partition substantially as and for the purpose described.

4. In an apparatus of the kind described, the upper die composed of a body-plate with an outer flange, central downwardly-projecting plungers and intermediate holes through the plate, a matrix arranged in the plane of said flange and plungers and cutters having cutting edges on the lower side, a block above the body-plate and screws connecting it to the matrix through the body-plate; in combination with a lower die composed of a body having a marginal shoulder, a partition with central upwardly-projecting plungers and handles for said body, and an upper and lower disk 29 and 27 connected together by screws through the partition of the body substantially as and for the purpose described.

5. A mold having a male and a female section, each of which sections is provided with fixed plungers and with movable matrices having openings to receive the plungers, the openings in the matrix of one section having cutting edges directed toward corresponding openings in the matrix of the other section, and means for forcing one matrix in direction of the other and for withdrawing the matrix thus forced, as described.

In testimony whereof I have signed my name to this specification in the presence of two subscribing witnesses.

ARTHUR J. NASH.

Witnesses:
J. FRED. ACKER,
JNO. M. RITTER.